United States Patent
Taherzadeh Boroujeni et al.

(10) Patent No.: US 12,520,342 B2
(45) Date of Patent: Jan. 6, 2026

(54) RESOURCES FOR JOINT CHANNEL ESTIMATION OF REPETITIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 618 days.

(21) Appl. No.: 17/810,061

(22) Filed: Jun. 30, 2022

(65) Prior Publication Data

US 2024/0008073 A1 Jan. 4, 2024

(51) Int. Cl.
*H04W 74/04* (2009.01)
*H04L 1/1812* (2023.01)
*H04W 74/08* (2024.01)

(52) U.S. Cl.
CPC ........... *H04W 74/04* (2013.01); *H04L 1/1812* (2013.01); *H04W 74/0866* (2013.01)

(58) Field of Classification Search
CPC .............. H04W 74/04; H04W 74/0866; H04L 1/1812; H04L 1/08; H04L 1/189; H04L 5/0094; H04L 1/1887
See application file for complete search history.

(56) References Cited

U.S. PATENT DOCUMENTS

| 12,155,491 | B2* | 11/2024 | Yi | H04L 1/1887 |
| 2024/0179689 | A1* | 5/2024 | Xiong | H04L 5/0094 |
| 2024/0215015 | A1* | 6/2024 | Su | H04W 72/569 |
| 2024/0373469 | A1* | 11/2024 | Wang | H04W 72/1268 |

FOREIGN PATENT DOCUMENTS

WO WO-2022028374 A1 2/2022

OTHER PUBLICATIONS

International Search Report and Written Opinion—PCT/US2023/023500—ISA/EPO—Sep. 1, 2023.
Moderator (ZTE Corporation) : "Feature Lead Summary #1 On Support of Type A PUSCH Repetitions for Msg3", 3GPP TSG RAN WG1 #106bis-e, R1-2110417, 3rd Generation Partnership Project, Mobile Competence Centre, 650, Route Des Lucioles, F-06921 Sophia-Antipolis Cedex, France vol. RAN WG1, No. e-Meeting, Oct. 11, 2021-Oct. 19, 2021, Oct. 14, 2021, XP052061112, pp. 1-51.

(Continued)

*Primary Examiner* — Chandrahas B Patel
(74) *Attorney, Agent, or Firm* — Harrity & Harrity, LLP

(57) ABSTRACT

Various aspects of the present disclosure generally relate to wireless communication. In some aspects, a user equipment (UE) may transmit an indication of a UE capability of the UE for maintaining uplink continuity of Msg3 repetitions. The UE may receive a configuration specifying resources that indicate Msg3 repetition is to be expected. The UE may transmit a physical random access channel (PRACH) message in the resources. The resources may include preamble resources that are dedicated for joint channel estimation of Msg3 repetitions or for joint channel estimation of PRACH repetitions. Numerous other aspects are described.

29 Claims, 13 Drawing Sheets

(56) References Cited

OTHER PUBLICATIONS

Moderator (ZTE Corporation) : "Feature Lead Summary #2 on Support of Type A PUSCH Repetitions for Msg3", 3GPP TSG RAN WG1 #105-e, R1-2106008, 3rd Generation Partnership Project, Mobile Competence Centre, 650, Route Des Lucioles, F-06921 Sophia-Antipolis Cedex, France vol. RAN WG1, No. e-Meeting, May 10, 2021-May 27, 2021, May 24, 2021, XP052013809, pp. 1-63.

Panasonic: "Discussion on Type A PUSCH Repetitions for Msg.3", 3GPP TSG RAN WG1 #106-e, R1-2107119, 3rd Generation Partnership Project, Mobile Competence Centre, 650, Route Des Lucioles, F-06921 Sophia-Antipolis Cedex, France vol. RAN WG1, No. e-Meeting Aug. 16, 2021-Aug. 27, 2021, Aug. 6, 2021, pp. 1-11, XP052033427.

\* cited by examiner

RESOURCES FOR JOINT CHANNEL ESTIMATION OF REPETITIONS

FIELD OF THE DISCLOSURE

Aspects of the present disclosure generally relate to wireless communication and to techniques and apparatuses for indicating resources for joint channel estimation of repetitions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting an indication of a UE capability of the UE for maintaining uplink continuity of Msg3 repetitions. The method may include receiving a configuration specifying resources that indicate Msg3 repetition is to be expected. The method may include transmitting a physical random access channel (PRACH) message in the resources.

Some aspects described herein relate to a method of wireless communication performed by a network entity. The method may include receiving a PRACH message in resources that indicate Msg3 repetition is to be expected. The method may include receiving Msg3 repetitions. The method may include performing joint channel estimation based on the Msg3 repetitions.

Some aspects described herein relate to a method of wireless communication performed by a UE. The method may include transmitting a capability indication of a UE capability of the UE for maintaining uplink continuity of contention-free random access (CFRA) uplink channel repetitions for joint channel estimation. The method may include transmitting the CFRA uplink channel repetitions.

Some aspects described herein relate to a method of wireless communication performed by a network entity. The method may include receiving an indication of a UE capability of a UE for maintaining uplink continuity of CFRA uplink channel repetitions for joint channel estimation. The method may include receiving the CFRA repetitions. The method may include performing joint channel estimation based on the CFRA uplink repetitions.

Some aspects described herein relate to a UE for wireless communication. The UE may include memory, one or more processors coupled to the memory, and instructions stored in the memory and executable by the one or more processors. The instructions may be executable by the one or more processors to cause the UE to transmit an indication of a UE capability of the UE for maintaining uplink continuity of Msg3 repetitions. The instructions may be executable by the one or more processors to cause the UE to receive a configuration specifying resources that indicate Msg3 repetition is to be expected. The instructions may be executable by the one or more processors to cause the UE to transmit a PRACH message in the resources.

Some aspects described herein relate to a network entity for wireless communication. The network entity may include memory, one or more processors coupled to the memory, and instructions stored in the memory and executable by the one or more processors. The instructions may be executable by the one or more processors to cause the network entity to receive a PRACH message in resources that indicate Msg3 repetition is to be expected. The instructions may be executable by the one or more processors to cause the network entity to receive Msg3 repetitions. The instructions may be executable by the one or more processors to cause the network entity to perform joint channel estimation based on the Msg3 repetitions.

Some aspects described herein relate to a UE for wireless communication. The UE may include memory, one or more processors coupled to the memory, and instructions stored in the memory and executable by the one or more processors. The instructions may be executable by the one or more processors to cause the UE to transmit a capability indication of a UE capability of the UE for maintaining uplink continuity of CFRA uplink channel repetitions for joint channel estimation. The instructions may be executable by the one or more processors to cause the UE to transmit the CFRA uplink channel repetitions.

Some aspects described herein relate to a network entity for wireless communication. The network entity may include memory, one or more processors coupled to the memory, and instructions stored in the memory and executable by the one or more processors. The instructions may be executable by the one or more processors to cause the network entity to receive an indication of a UE capability of a UE for maintaining uplink continuity of CFRA uplink channel repetitions for joint channel estimation. The instructions may be executable by the one or more processors to cause the network entity to receive the CFRA repetitions. The instructions may be executable by the one or more processors to cause the network entity to perform joint channel estimation based on the CFRA uplink repetitions.

Some aspects described herein relate to a non-transitory computer-readable medium that stores one or more instructions for wireless communication by a UE. The one or more instructions, when executed by one or more processors of the UE, may cause the UE to transmit an indication of a UE capability of the UE for maintaining uplink continuity of Msg3 repetitions. The one or more instructions, when executed by one or more processors of the UE, may cause the UE to receive a configuration specifying resources that indicate Msg3 repetition is to be expected. The one or more instructions, when executed by one or more processors of the UE, may cause the UE to transmit a PRACH message in the resources.

Some aspects described herein relate to a non-transitory computer-readable medium that stores one or more instructions for wireless communication by a network entity. The one or more instructions, when executed by one or more processors of the network entity, may cause the network entity to receive a PRACH message in resources that indicate Msg3 repetition is to be expected. The one or more instructions, when executed by one or more processors of the network entity, may cause the network entity to receive Msg3 repetitions. The one or more instructions, when executed by one or more processors of the network entity, may cause the network entity to perform joint channel estimation based on the Msg3 repetitions.

Some aspects described herein relate to a non-transitory computer-readable medium that stores one or more instructions for wireless communication by a UE. The one or more instructions, when executed by one or more processors of the UE, may cause the UE to transmit a capability indication of a UE capability of the UE for maintaining uplink continuity of CFRA uplink channel repetitions for joint channel estimation. The one or more instructions, when executed by one or more processors of the UE, may cause the UE to transmit the CFRA uplink channel repetitions.

Some aspects described herein relate to a non-transitory computer-readable medium that stores one or more instructions for wireless communication by a network entity. The one or more instructions, when executed by one or more processors of the network entity, may cause the network entity to receive an indication of a UE capability of a UE for maintaining uplink continuity of CFRA uplink channel repetitions for joint channel estimation. The one or more instructions, when executed by one or more processors of the network entity, may cause the network entity to receive the CFRA repetitions. The one or more instructions, when executed by one or more processors of the network entity, may cause the network entity to perform joint channel estimation based on the CFRA uplink repetitions.

Some aspects described herein relate to an apparatus for wireless communication. The apparatus may include means for transmitting an indication of a capability of the apparatus for maintaining uplink continuity of Msg3 repetitions. The apparatus may include means for receiving a configuration specifying resources that indicate Msg3 repetition is to be expected. The apparatus may include means for transmitting a PRACH message in the resources.

Some aspects described herein relate to an apparatus for wireless communication. The apparatus may include means for receiving a PRACH message in resources that indicate Msg3 repetition is to be expected. The apparatus may include means for receiving Msg3 repetitions. The apparatus may include means for performing joint channel estimation based on the Msg3 repetitions.

Some aspects described herein relate to an apparatus for wireless communication. The apparatus may include means for transmitting a capability indication of a capability of the apparatus for maintaining uplink continuity of CFRA uplink channel repetitions for joint channel estimation. The apparatus may include means for transmitting the CFRA uplink channel repetitions.

Some aspects described herein relate to an apparatus for wireless communication. The apparatus may include means for receiving an indication of a capability of a UE for maintaining uplink continuity of CFRA uplink channel repetitions for joint channel estimation. The apparatus may include means for receiving the CFRA repetitions. The apparatus may include means for performing joint channel estimation based on the CFRA uplink repetitions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
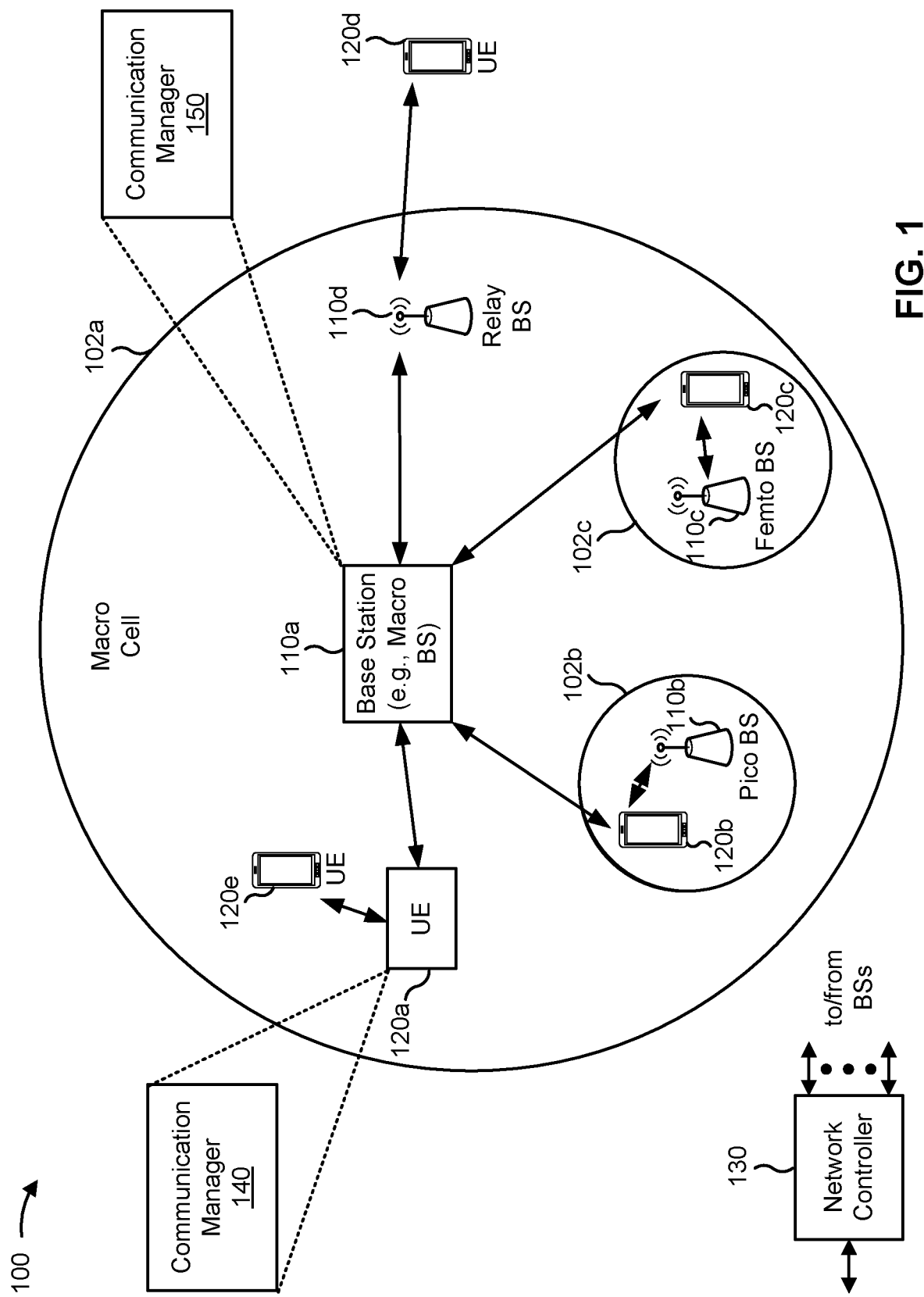
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) MC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit an indication of a UE capability of the UE for maintaining uplink continuity of Msg3 repetitions. The communication manager 140 may receive a configuration specifying resources that indicate Msg3 repetition is to be expected and transmit a physical random access channel (PRACH) message in the resources.

In some aspects, the communication manager 140 may transmit a capability indication of a UE capability of the UE for maintaining uplink continuity of contention-free random access (CFRA) uplink channel repetitions for joint channel estimation and transmit the CFRA uplink channel repetitions. Additionally, or alternatively, the communication manager 140 may perform one or more other operations described herein.

In some aspects, a network entity (e.g., base station 110) may include a communication manager 150. As described in more detail elsewhere herein, the communication manager 150 may receive a PRACH message in resources that indicate Msg3 repetition is to be expected; receive Msg3 repetitions and perform joint channel estimation based on the Msg3 repetitions.

In some aspects, the communication manager 150 may receive an indication of a UE capability of the UE for maintaining uplink continuity of CFRA uplink channel repetitions for joint channel estimation; receive the CFRA repetitions and perform joint channel estimation based on the CFRA uplink repetitions. Additionally, or alternatively, the communication manager 150 may perform one or more other operations described herein.

As indicated above, FIG. 1 is provided as an example. Other examples may differ from what is described with regard to FIG. 1.

Figure 2:
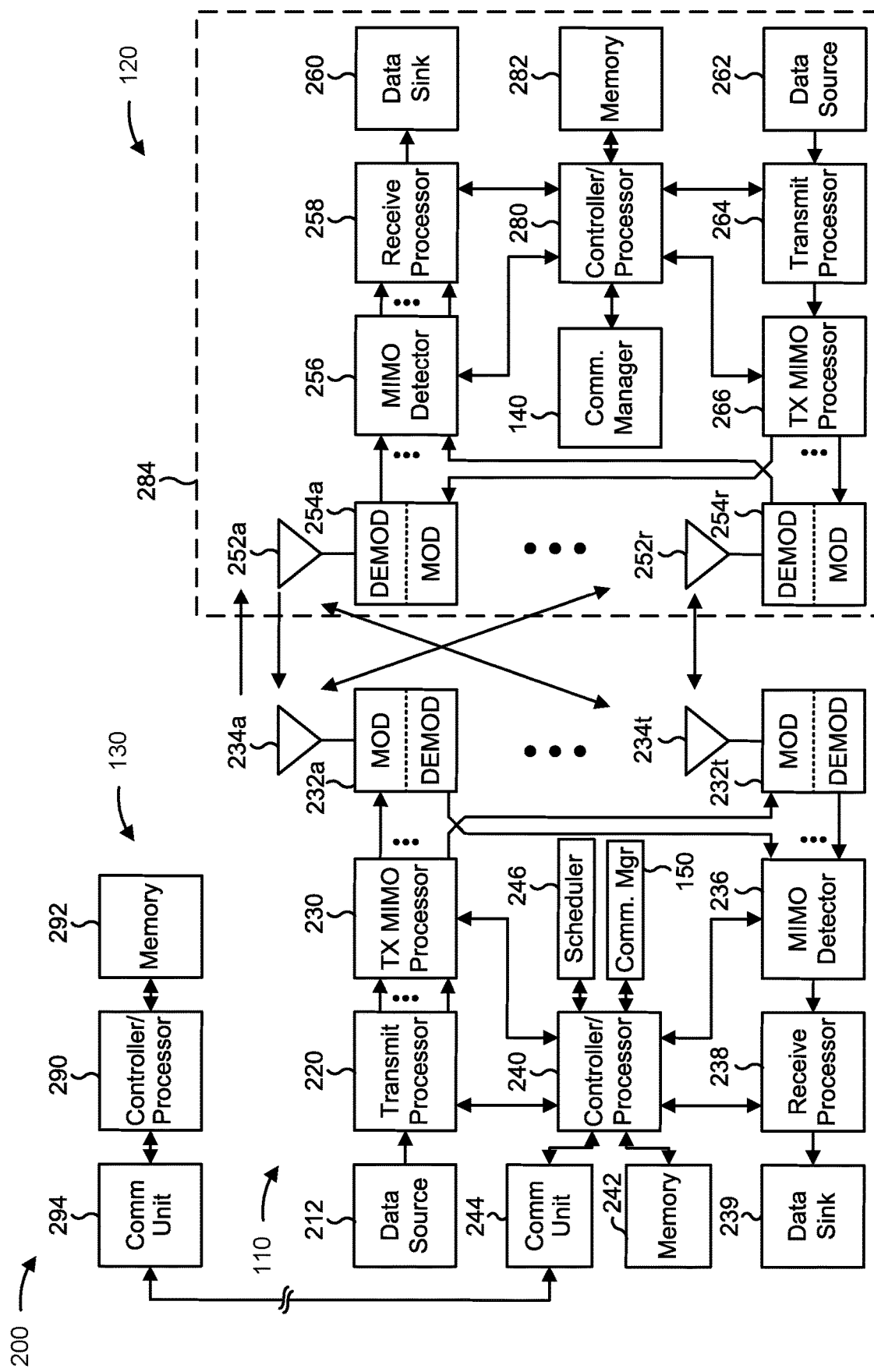
FIG. 2 is a diagram illustrating an example of a base station in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

A controller/processor of a network entity (e.g., the controller/processor 240 of the base station 110), the controller/processor 280 of the UE 120, and/or any other component(s) of FIG. 2 may perform one or more techniques associated with indicating resources for joint channel estimation of random access channel repetitions, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for transmitting an indication of a UE capability of the UE for maintaining uplink continuity of Msg3 repetitions; means for receiving a configuration specifying resources that indicate Msg3 repetition is to be expected; and/or means for transmitting a PRACH message in the resources. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for transmitting a capability indication of a UE capability of the UE for maintaining uplink continuity of CFRA uplink channel repetitions for joint channel estimation; and/or means for transmitting the CFRA uplink channel repetitions.

In some aspects, a network entity (e.g., base station 110) includes means for receiving a PRACH message in resources that indicate Msg3 repetition is to be expected; means for receiving Msg3 repetitions; and/or means for performing joint channel estimation based on the Msg3 repetitions. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network entity includes means for receiving an indication of a UE capability of the UE for maintaining uplink continuity of CFRA uplink channel repetitions for joint channel estimation; means for receiving the CFRA repetitions; and/or means for performing joint channel estimation based on the CFRA uplink repetitions.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
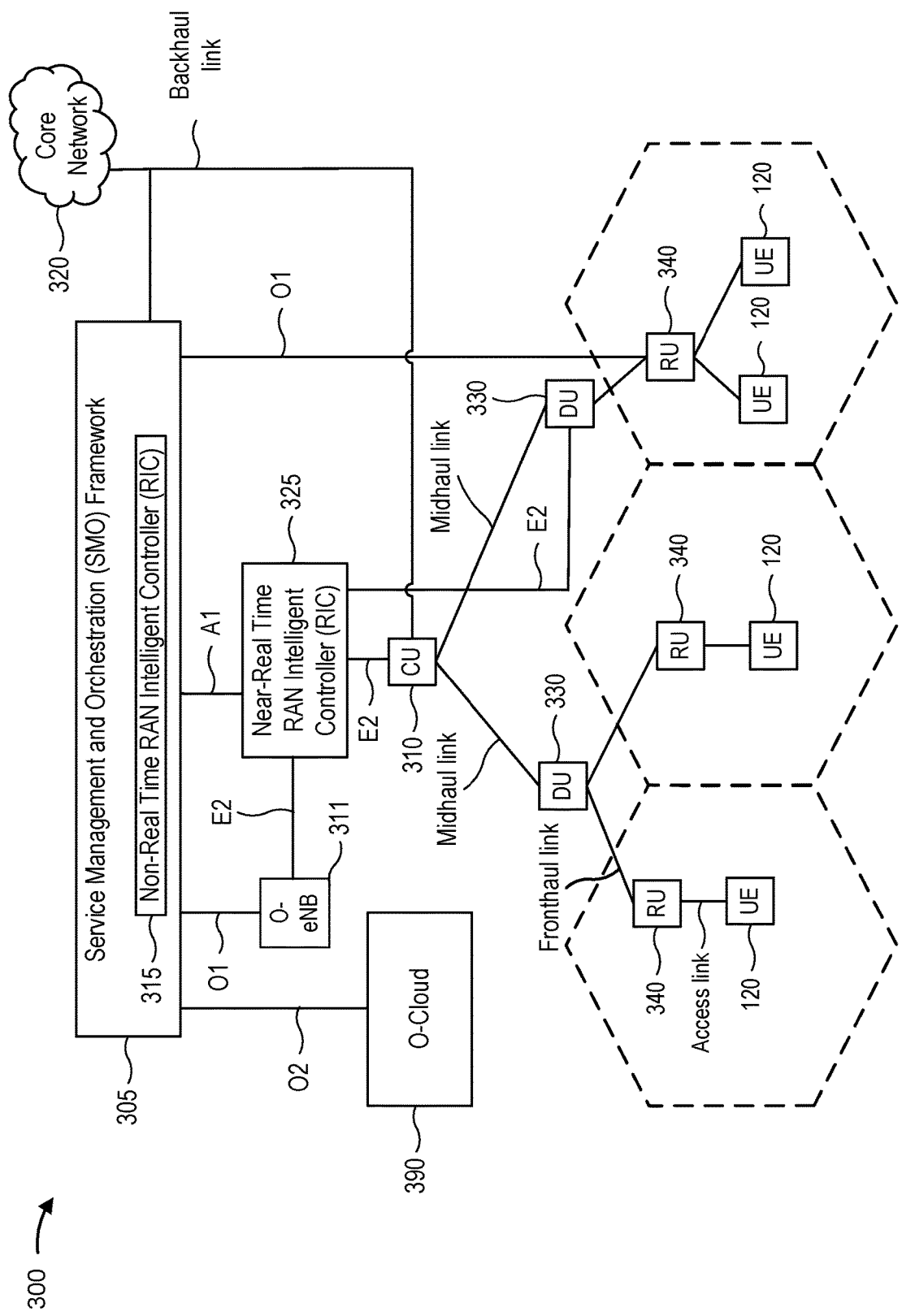
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, PRACH extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an with the Near-RT RIC 325.

In some implementations, to generate AI/ML models to be deployed in the Near-RT MC 325, the Non-RT MC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
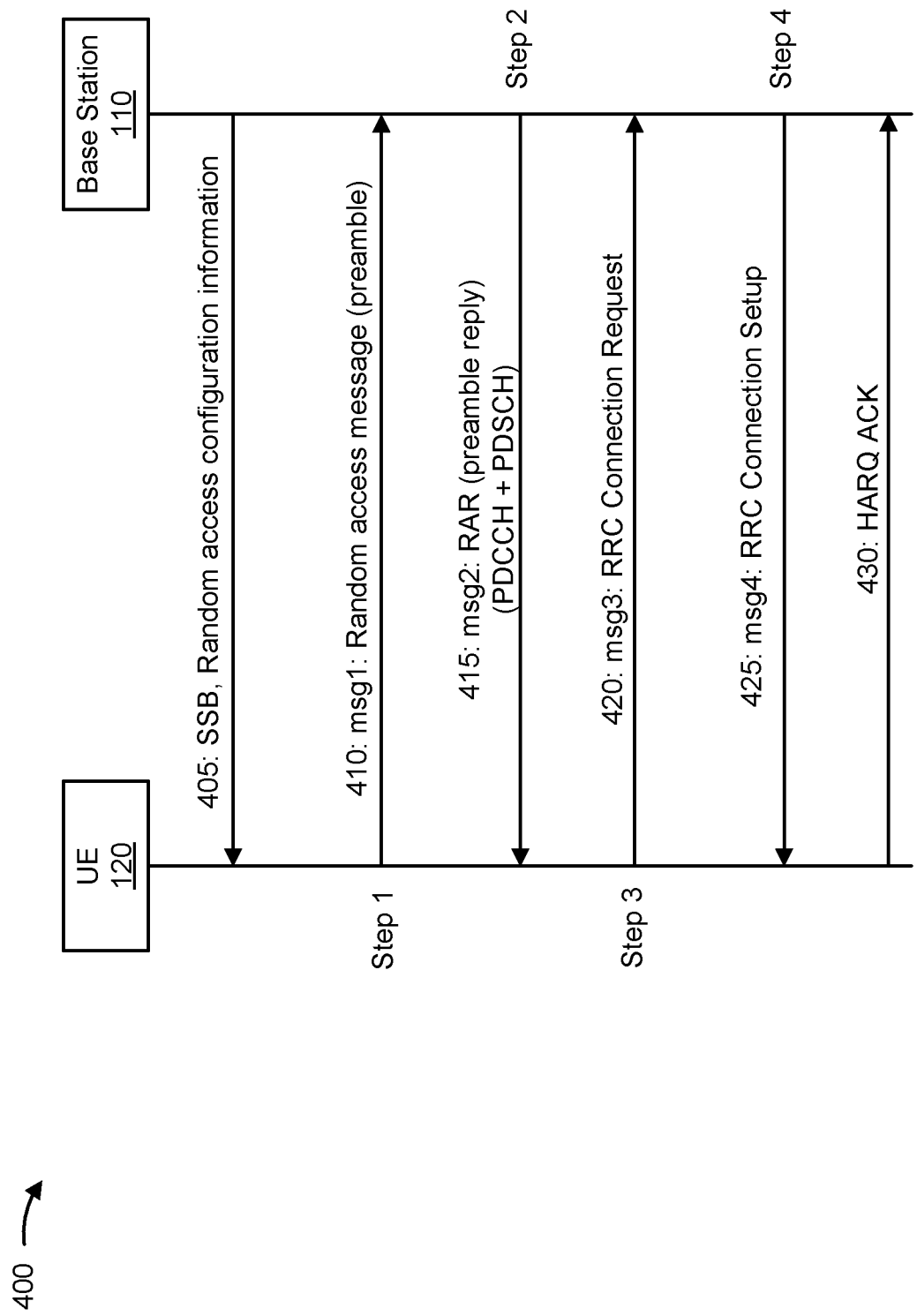
FIG. 4 is a diagram illustrating an example of a four-step random access procedure, in accordance with the present disclosure.

FIG. 4 is a diagram illustrating an example of a four-step random access procedure, in accordance with the present disclosure. As shown in FIG. 4, a network entity (e.g., base station 110) and a UE 120 may communicate with one another to perform the four-step random access procedure.

As shown by reference number 405, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in an RRC message and/or a physical downlink control channel (PDCCH) order message that triggers a random access channel (RACH) procedure, such as for CFRA. The random access configuration information may include one or more parameters to be used in the random access procedure, such as one or more parameters for transmitting a random access message (RAM) and/or one or more parameters for receiving a random access response (RAR).

As shown by reference number 410, the UE 120 may transmit a RAM, which may include a preamble (sometimes referred to as a random access preamble, a PRACH preamble, or a RAM preamble). The message that includes the preamble may be referred to as a message 1, Msg1, msg1, MSG1, a first message, or an initial message in a four-step RACH procedure. The random access message may include a random access preamble identifier.

As shown by reference number 415, the base station 110 may transmit an RAR as a reply to the preamble. The message that includes the RAR may be referred to as message 2, Msg2, msg2, MSG2, or a second message in a four-step RACH procedure. In some aspects, the RAR may indicate the detected random access preamble identifier (e.g., received from the UE 120 in Msg1). Additionally, or alternatively, the RAR may indicate a resource allocation to be used by the UE 120 to transmit message 3 (Msg3).

In some aspects, as part of the second step of the four-step RACH procedure, the base station 110 may transmit a PDCCH communication for the RAR. The PDCCH communication may schedule a physical downlink shared channel (PDSCH) communication that includes the RAR. For example, the PDCCH communication may indicate a resource allocation (e.g., uplink grant for next message, timing advance, temporary cell radio network temporary identifier (TC-RNTI)) for the PDSCH communication. Also as part of the second step of the four-step RACH procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 420, the UE 120 may transmit an RRC connection request message. The RRC connection request message may be referred to as message 3, Msg3, msg3, MSG3, or a third message of a four-step RACH procedure. In some aspects, the RRC connection request may include a UE identifier, uplink control information (UCI), and/or a physical uplink shared channel (PUSCH) communication (e.g., an RRC connection request, scheduling request, and/or buffer status).

As shown by reference number 425, the base station 110 may transmit an RRC connection setup message. The RRC connection setup message may be referred to as message 4, Msg4, msg4, MSG4, or a fourth message of a four-step RACH procedure. In some aspects, the RRC connection setup message may include the detected UE identifier, a timing advance value, and/or contention resolution information. As shown by reference number 430, if the UE 120 successfully receives the RRC connection setup message, the UE 120 may transmit a hybrid automatic repeat request (HARD) acknowledgement (ACK).

As indicated above, FIG. 4 is provided as an example. Other examples may differ from what is described with regard to FIG. 4.

Figure 5:
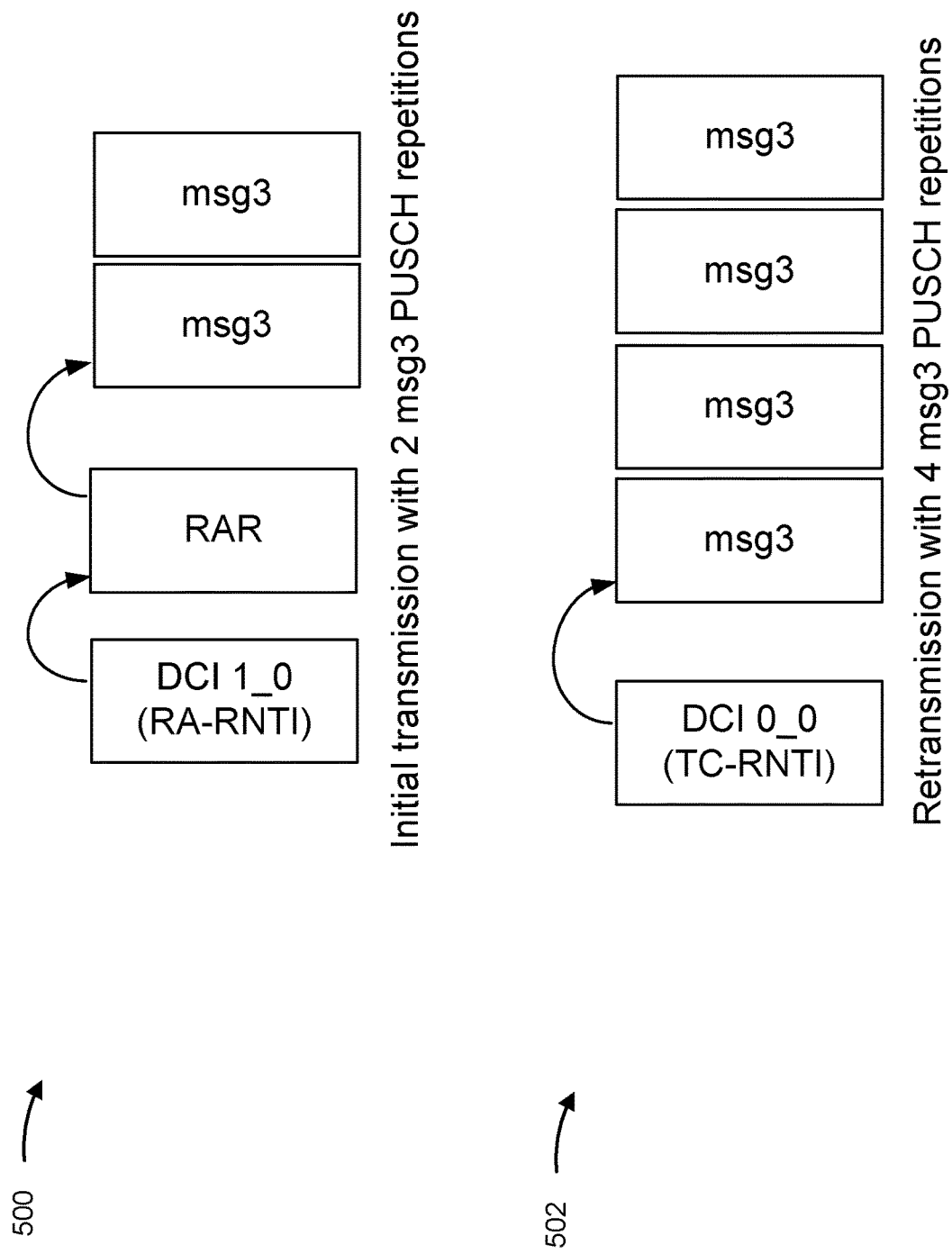
FIG. 5 is a diagram illustrating examples of Msg3 repetition, in accordance with the present disclosure.

FIG. 5 is a diagram illustrating examples 500 and 502 of Msg3 repetition, in accordance with the present disclosure.

The transmission of a Msg3 of the RACH procedure may become bottlenecked due to traffic conditions on the PUSCH. Furthermore, the UE 120 may expect to successfully receive both the RAR for an initial transmission and TC-RNTI-scrambled downlink control information (DCI) for retransmission, and there may be high PDCCH overhead. If the Msg3 is not successfully received, retransmission may occur and increase initial access latency. To successfully deliver the Msg3 for an initial transmission, the UE 120 may repeat transmission of the Msg3. This may increase the probability of successfully delivering the Msg3. Msg3 repetition may also be used for retransmission.

Example 500 shows a Msg2 for an initial transmission by a network entity (e.g., base station 110, gNB). The Msg2 may be a DCI 1_0 format that is scrambled with a random access RNTI (RA-RNTI). After the RAR, the UE 120 may transmit msg3 repetitions for the initial transmission. The UE 120 may start a contention resolution timer. If the contention resolution timer expires without positive feedback (or if negative feedback is received), the UE 120 may determine that the initial transmission is not successful and that retransmission is to occur. Example 502 shows that the network entity may transmit a DCI format 0_0 with a cyclic redundancy check (CRC) that is scrambled with a TC-RNTI. The DCI may provide an uplink grant or otherwise specify a resource for a retransmission. The UE 120 may transmit Msg3 repetitions for the retransmission. The Msg3 repetitions may be Type A PUSCH repetitions, which carry the same transport block across the available slots while applying the same symbol allocation (start symbol and transmission duration) in each slot.

A UE 120 may request Msg3 repetition via separate PRACH resources based on channel conditions, such as an RSRP measurement satisfying a threshold (e.g., minimum RSRP). For example, the RSRP measurement may satisfy the threshold if the RSRP measurement is equal to or less than the threshold. If Msg3 repetition is requested by the UE 120, the network entity may determine whether to schedule Msg3 repetitions. The Msg3 repetitions may include multiple Msg3 repetitions, such as 1, 2, 3, 4, 7, 8, 12, or 16 Msg3 repetitions. In some aspects, the UE 120 may request Msg3 repetition using a separate set of preambles or frequency resources that are dedicated for requesting Msg3 repetition.

The network entity may indicate a quantity of Msg3 repetitions that the UE 120 is to use for an initial transmission. For example, the network entity may transmit a value of a time domain resource allocation (TDRA) field that indicates the quantity of Msg3 repetitions to use for the initial transmission. The TDRA field may normally specify a time or frequency resource that is allocated for an uplink transmission, but the TDRA field may be reused to indicate the quantity of Msg3 repetitions. The TDRA field may be a column in a TDRA table. The candidate values for a repetition factor may be selected from among 1, 2, 3, 4, 7, 8, 12, or 16. Alternatively, the network entity may indicate the quantity of Msg3 repetitions for the initial transmission using an MCS information field. That is, the MCS information field may normally indicate an MCS for encoding and decoding. However, the MCS information field may be reused to indicate the quantity of Msg3 repetitions. For example, the two most significant bits (MSB) bits of the MCS information field may be used for selecting one repetition factor from a SIB1 configured set with four candidate values.

However, the UE 120 may not know that a particular field is being used to indicate the quantity of Msg3 repetitions for an initial transmission or for a retransmission. If the UE 120 does not know which field or how the network entity is indicating the msg repetition quantity, the UE 120 may not successfully deliver the initial transmission or a retransmission. This may degrade communications or cause the UE 120 to consume additional processing resources and signaling resources with retransmissions.

As indicated above, FIG. 5 provides some examples. Other examples may differ from what is described with regard to FIG. 5.

Figure 6:
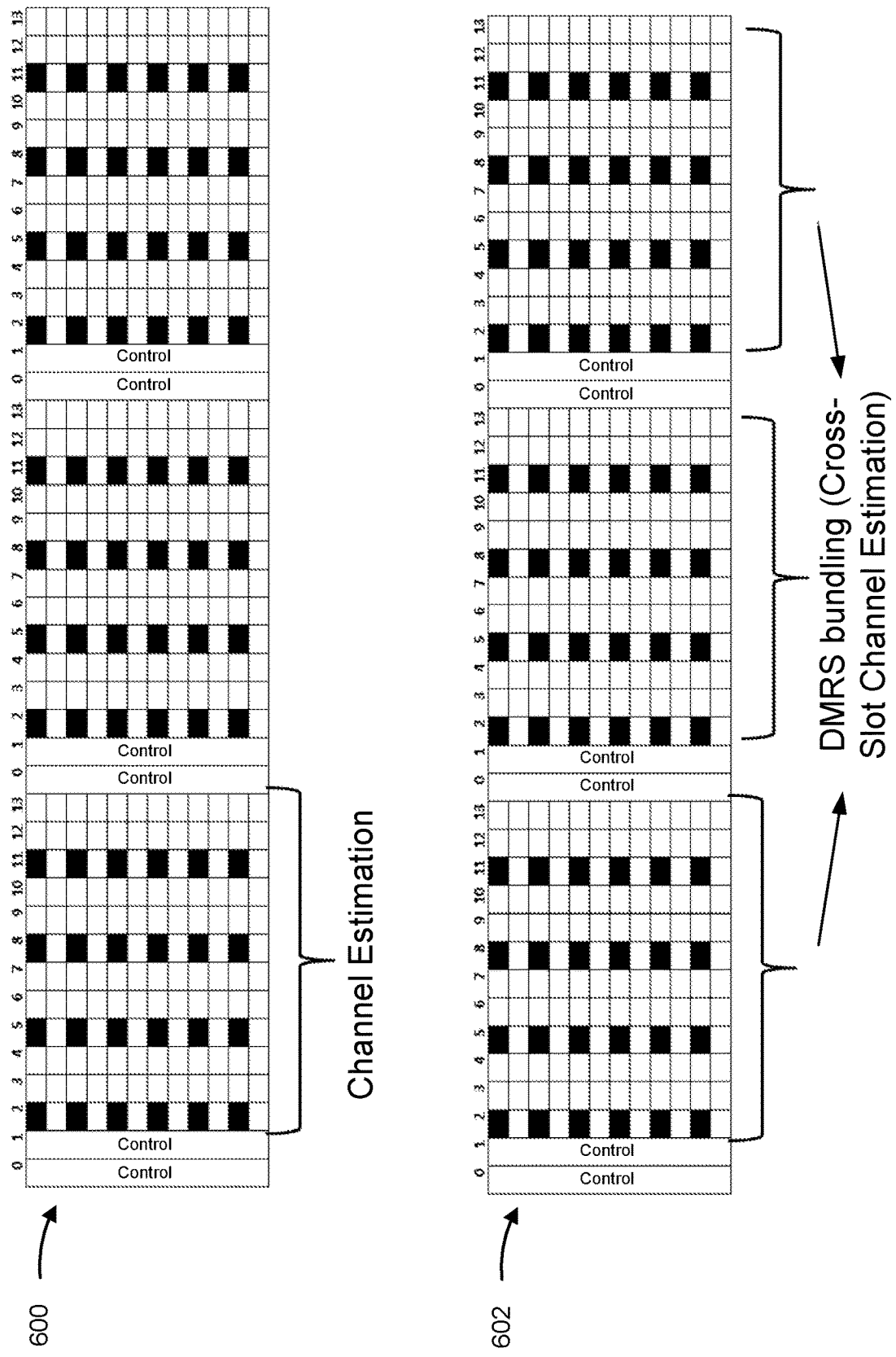
FIG. 6 is a diagram illustrating examples of channel estimation, in accordance with the present disclosure.

FIG. 6 is a diagram illustrating examples 600 and 602 of channel estimation, in accordance with the present disclosure.

Example 600 shows three slots of transport blocks. A receiving UE (or a receiving network entity) may use DMRSs in each transport block for channel estimation. That is, channel estimation is performed for each time instance (e.g., slot), separately. Example 602 shows joint channel estimation, using DMRSs of the three transport blocks together. This may be referred to as "cross-slot channel estimation," "DMRS bundling," or "joint channel estimation." Joint channel estimation may improve the accuracy of channel estimation because the estimates involve information across multiple slots.

In some aspects, a network entity may perform joint channel estimation with Msg3 repetition. However, the ability of the network entity to perform joint channel estimation over Msg3 repetitions may depend on a UE capability for maintaining uplink continuity (e.g., maintaining phase continuity among Msg3 repetitions in different slots). It has not been specified how the UE 120 can indicate an uplink continuity capability before Msg3 repetition and how to provide the indication without consuming too much overhead (signaling resources).

As indicated above, FIG. 6 provides some examples. Other examples may differ from what is described with regard to FIG. 6.

Figure 7:
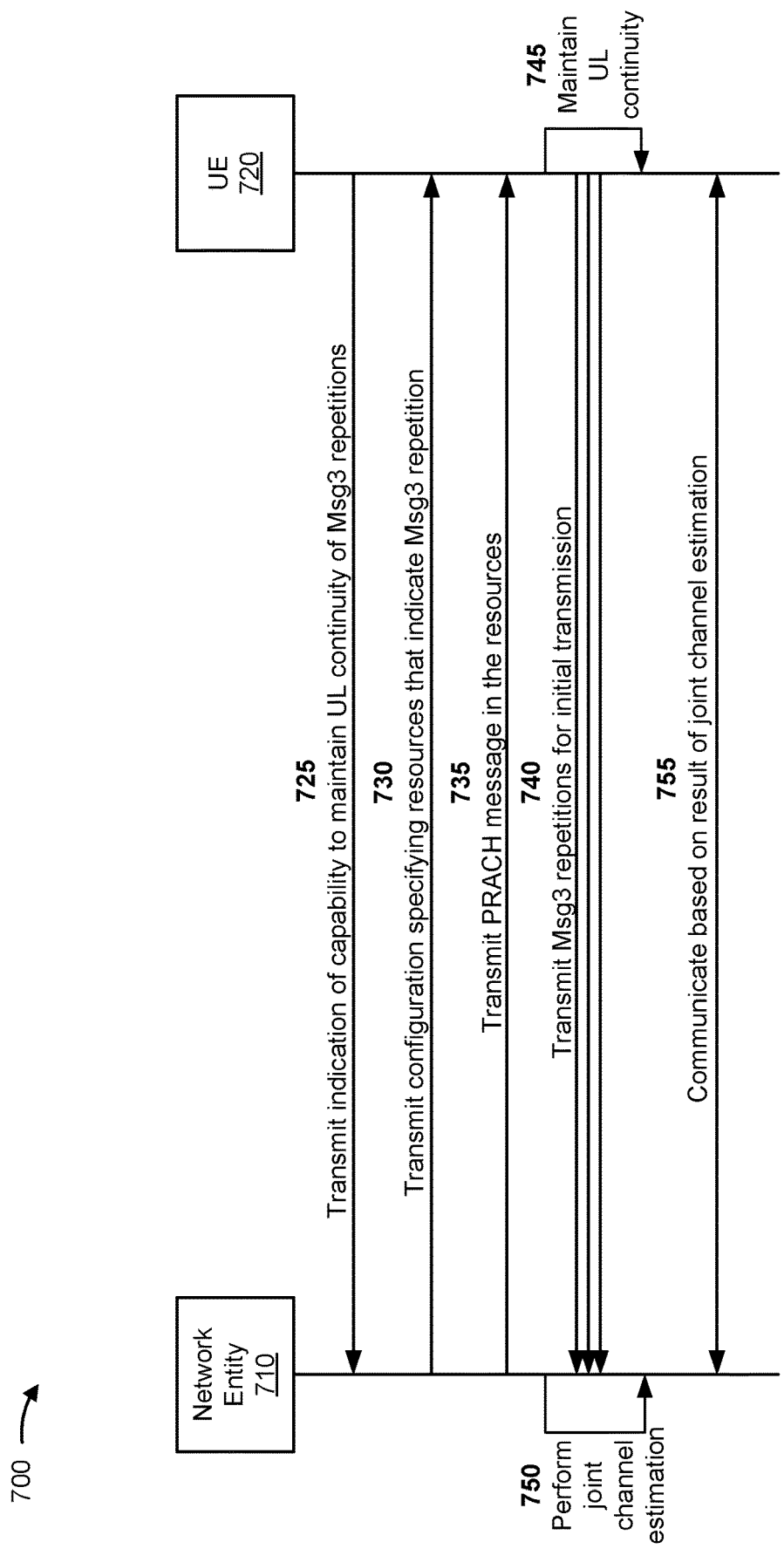
FIG. 7 is a diagram illustrating an example of indicating a field for a quantity of Msg3 repetitions, in accordance with the present disclosure.

FIG. 7 is a diagram illustrating an example 700 of indicating a field for a quantity of Msg3 repetitions, in accordance with the present disclosure. As shown in FIG. 7, a base station (e.g., base station 110) and a UE (e.g., a UE 120) may communicate with one another.

According to various aspects described herein, the UE 720 may transmit an indication of a UE capability of the UE 720 for maintaining uplink (UL) continuity of Msg3 repetitions, as shown by reference number 725. The UE capability may indicate that the UE 720 can maintain uplink continuity for Msg3 repetitions. The UE capability may be associated with phase differences among the Msg3 repetitions that are below a difference threshold or an average phase difference that is below the difference threshold. The UE capability may indicate that the UE 720 cannot maintain uplink continuity for Msg3 repetitions. In some aspects, the UE 720 may transmit an indication of a UE capability of the UE 720 for maintaining uplink continuity of PRACH repetitions or CFRA PUSCH repetitions.

The UE 720 may receive a configuration specifying resources that can be used to indicate, to the network entity 710, that Msg3 repetition is to be expected, as shown by reference number 730. The resources may include frequency resources for Msg3 repetition that are separate from other frequency resources in an active bandwidth part (BWP). The resources may include preamble resources that are dedicated for joint channel estimation of Msg3 repetitions. For example, the network entity 710 may configure separate frequency resources and/or a combination of preamble resources and PRACH repetition for indicating Msg3 repetition by the UE 720.

As shown by reference number 735, the UE 720 may transmit a PRACH message in the specified resources. The PRACH message may be a PRACH preamble. The PRACH message may include PRACH repetitions. Transmission of the PRACH message in the specified resources may indicate Msg3 repetition or PRACH repetition. Transmission of the PRACH message in the specified resources may indicate uplink continuity for Msg3 repetitions or for PRACH repetitions. For example, the specified resources may include preamble resources that are dedicated for joint channel estimation of Msg3 repetitions or for joint channel estimation of PRACH repetitions. Transmission of the PRACH message in the preamble resources may indicate uplink continuity for Msg3 repetitions or for PRACH repetitions. The network entity 710 may then expect and prepare for phase continuity across Msg3 repetitions or PRACH repetitions. Using the preamble resources, for example, may be efficient because the PRACH transmission may otherwise have to further divide PRACH resources or RACH occasions.

As shown by reference number 740, the UE 720 may transmit Msg3 repetitions. As shown by reference number 745, the UE 720 may maintain uplink continuity during the Msg3 repetitions based at least in part on the UE capability. As shown by reference number 750, the network entity 710 may perform joint channel estimation based on the Msg3 repetitions. As shown by reference number 755, the network entity 710 may communicate (transmit and/or receive communications) with the UE 720 based at least in part on a result (e.g., joint channel estimate) of the joint channel estimation.

In some aspects, a combination of preamble resource selection (e.g., from a preconfigured subset) and PRACH repetition (for Msg3 repetition) may be used independent of any triggering criteria for PRACH repetition. In some aspects, the configuration may include an indication that the UE 720 is to maintain uplink continuity for Msg3 repetitions, PRACH repetitions, or neither Msg3 repetitions nor PRACH repetitions, and the UE 720 may maintain or not maintain uplink continuity based on the indication, as shown by reference number 745.

In some aspects, the configuration may indicate a configured time domain window that is associated with Msg3 repetition, and the UE 720 may maintain uplink continuity during the configured time domain window. The time domain window may affect the pattern of inter-slot frequency hopping for Msg3 repetitions. Accordingly, the UE 720 may refrain from frequency-hopping during the configured time domain window. The network entity 710 may configure the UE 720 with the time domain window via an RRC message. The time domain window may be associated with separate frequency resources and/or a separate combination of preamble resources and PRACH repetition for Msg3 repetition.

In some aspects, the network entity 710 may apply joint channel estimation for reception of repetitions of CFRA PUSCH communications based at least in part on a prior configuration (by the network entity 710) and/or a capability indication by the UE 720. This may apply to reception of PRACH repetitions in CFRA (in case of PRACH repetition). Applying joint channel estimation for repetitions of CFRA PUSCH communications may be based at least in part on a prior configuration of the time domain window and/or the enabling of joint channel estimation for repetitions of regular (non-random access) PUSCH communications. In some aspects, the time domain window for joint channel estimation of repetitions of CFRA PUSCH communications may be the same as the time domain window of the regular PUSCH communications. In some aspects, the time domain window for joint channel estimation of repetitions of CFRA PUSCH communications may be different than the time domain window of the regular PUSCH communications. The size of the time domain window for the joint channel estimation may be based at least in part on the time domain window of the regular PUSCH communications. For example, the time domain window for joint channel estimation may be equal to a minimum of the time domain window of regular PUSCH communications and a specified value or a preconfigured window size. The process for configuring the UE 720 to maintain uplink continuity in association with joint channel estimation of repetitions of CFRA PUSCH communications may be similar to the process described for the Msg3 repetitions in example 700. By indicating a UE capability for maintaining uplink continuity of random access procedure repetitions, such as Msg3 repetitions, in specified resources, the network entity 710 may perform joint channel estimation on the random access procedure repetitions and improve the accuracy of channel estimates without significantly increasing signaling overhead. Accurate channel estimates improve communications and conserve processing resources and signaling resources.

As indicated above, FIG. 7 is provided as an example. Other examples may differ from what is described with regard to FIG. 7.

Figure 8:
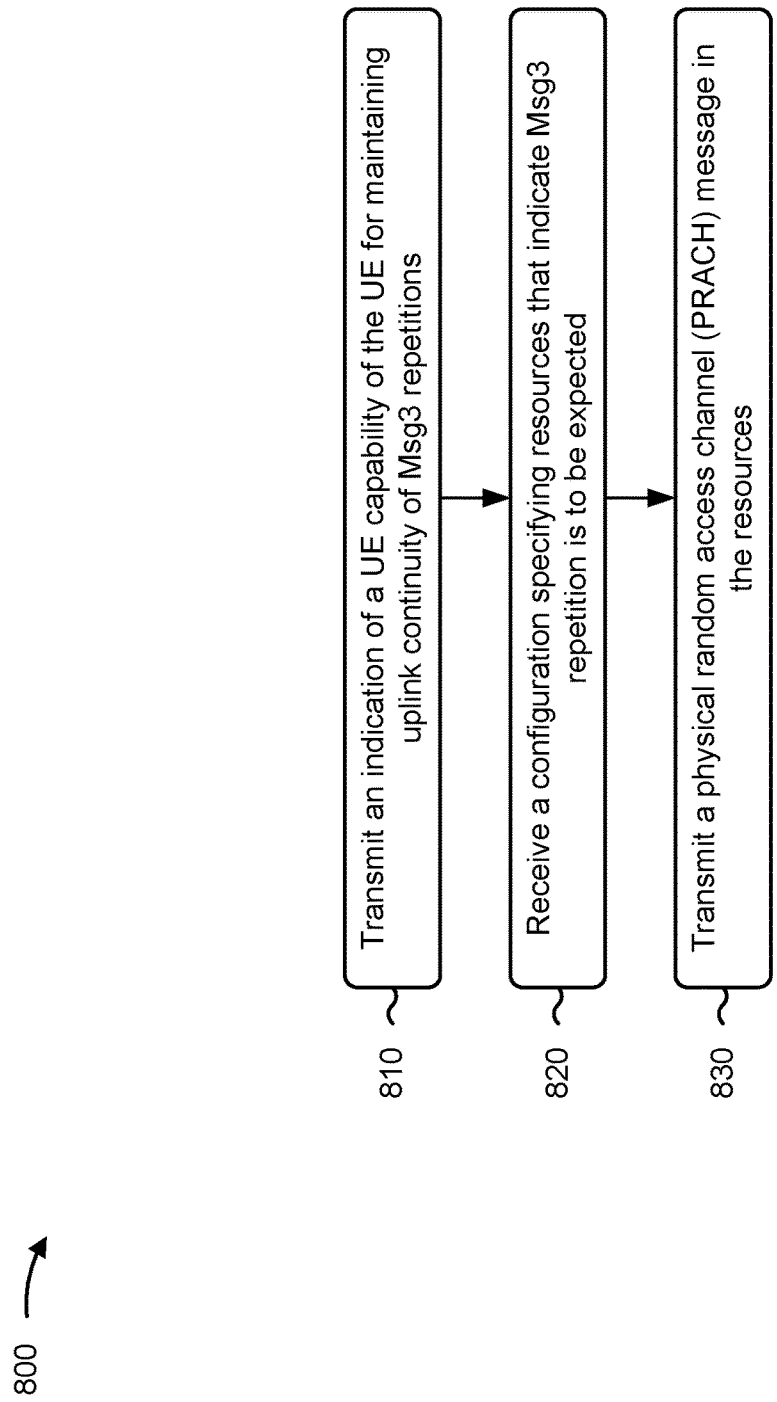
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., a UE 120, UE 720) performs operations associated with using resources for indicating a UE capability of maintaining uplink continuity of random access channel repetitions for joint channel estimation.

As shown in FIG. 8, in some aspects, process 800 may include transmitting an indication of a UE capability of the UE for maintaining uplink continuity of Msg3 repetitions (block 810). For example, the UE (e.g., using communication manager 1208 and/or transmission component 1204 depicted in FIG. 12) may transmit an indication of a UE capability of the UE for maintaining uplink continuity of Msg3 repetitions, as described above.

As further shown in FIG. 8, in some aspects, process 800 may include receiving a configuration specifying resources that indicate Msg3 repetition is to be expected (block 820). For example, the UE (e.g., using communication manager 1208 and/or reception component 1202 depicted in FIG. 12) may receive a configuration specifying resources that indicate Msg3 repetition is to be expected, as described above.

As further shown in FIG. 8, in some aspects, process 800 may include transmitting a PRACH message in the resources (block 830). For example, the UE (e.g., using communication manager 1208 and/or transmission component 1204 depicted in FIG. 12) may transmit a PRACH message in the resources, as described above.

Process 800 may include additional aspects, such as any single aspect or any combination of aspects described below and/or in connection with one or more other processes described elsewhere herein.

In a first aspect, process 800 includes transmitting the Msg3 repetitions.

In a second aspect, alone or in combination with the first aspect, the resources include frequency resources that are separate from other frequency resources in an active BWP.

In a third aspect, alone or in combination with one or more of the first and second aspects, the resources include preamble resources that are dedicated for joint channel estimation of Msg3 repetitions or for joint channel estimation of PRACH repetitions.

In a fourth aspect, alone or in combination with one or more of the first through third aspects, process 800 includes using PRACH repetition in combination with the preamble resources to indicate Msg3 repetition.

In a fifth aspect, alone or in combination with one or more of the first through fourth aspects, the configuration includes an indication that the UE is to maintain uplink continuity for Msg3 repetitions, PRACH repetitions, or neither Msg3 repetitions nor PRACH repetitions, and process 800 includes maintaining uplink continuity based on the indication.

In a sixth aspect, alone or in combination with one or more of the first through fifth aspects, the configuration indicates a configured time domain window that is associated with Msg3 repetition, and process 800 includes maintaining uplink continuity during the configured time domain window.

In a seventh aspect, alone or in combination with one or more of the first through sixth aspects, process 800 includes refraining from frequency-hopping during the configured time domain window.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
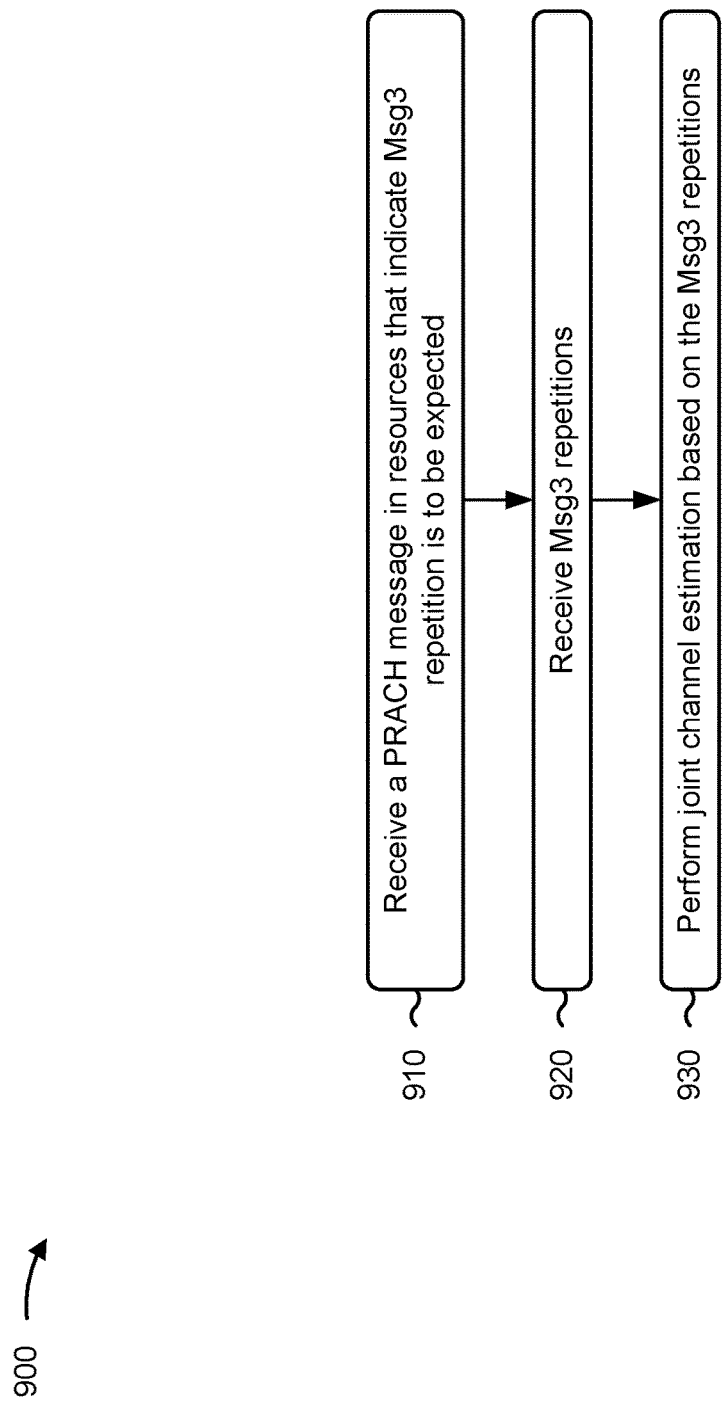
FIG. 9 is a diagram illustrating an example process performed, for example, by a network entity, in accordance with the present disclosure.

FIG. 9 is a diagram illustrating an example process 900 performed, for example, by a network entity, in accordance with the present disclosure. Example process 900 is an example where the network entity (e.g., base station 110, network entity 710) performs operations associated with configuring resources for indicating a UE capability of maintaining uplink continuity of random access channel repetitions for joint channel estimation.

As shown in FIG. 9, in some aspects, process 900 may include receiving a PRACH message in resources that indicate Msg3 repetition is to be expected (block 910). For example, the network entity (e.g., using communication manager 1308 and/or reception component 1302 depicted in FIG. 13) may receive a PRACH message in resources that indicate Msg3 repetition is to be expected, as described above.

As further shown in FIG. 9, in some aspects, process 900 may include receiving Msg3 repetitions (block 920). For example, the network entity (e.g., using communication manager 1308 and/or reception component 1302 depicted in FIG. 13) may receive Msg3 repetitions, as described above.

As further shown in FIG. 9, in some aspects, process 900 may include performing joint channel estimation based on the Msg3 repetitions (block 930). For example, the network entity (e.g., using communication manager 1308 and/or channel estimation component 1310 depicted in FIG. 13) may perform joint channel estimation based on the Msg3 repetitions, as described above.

Process 900 may include additional aspects, such as any single aspect or any combination of aspects described below and/or in connection with one or more other processes described elsewhere herein.

In a first aspect, process 900 includes receiving an indication of a UE capability for maintaining uplink continuity of the Msg3 repetitions for the joint channel estimation and transmitting a configuration specifying the resources based at least in part on the UE capability.

In a second aspect, alone or in combination with the first aspect, the resources include frequency resources that are separate from other frequency resources in an active bandwidth part.

In a third aspect, alone or in combination with one or more of the first and second aspects, process 900 includes determining that Msg3 repetition is to be expected based on use of the frequency resources in combination with PRACH repetitions.

In a fourth aspect, alone or in combination with one or more of the first through third aspects, the resources include preamble resources that are dedicated for joint channel estimation of Msg3 repetitions.

In a fifth aspect, alone or in combination with one or more of the first through fourth aspects, process 900 includes receiving PRACH repetitions, and performing joint channel estimation based on the PRACH repetitions.

In a sixth aspect, alone or in combination with one or more of the first through fifth aspects, process 900 includes transmitting a configuration that indicates a configured time domain window that is associated with Msg3 repetition, and the performing joint channel estimation includes performing joint channel estimation only within the configured time domain window.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
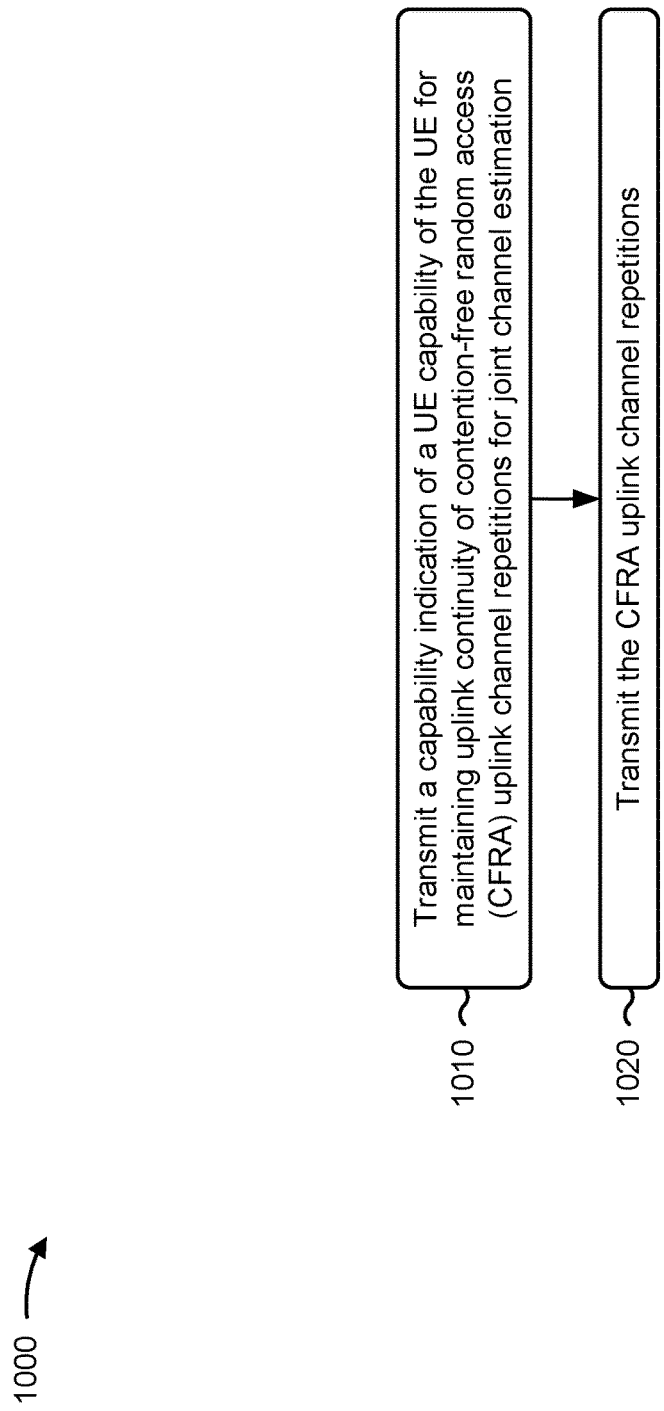
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., a UE 120, UE 720) performs operations associated with using resources for indicating a UE capability of maintaining uplink continuity of random access channel repetitions for joint channel estimation.

As shown in FIG. 10, in some aspects, process 1000 may include transmitting a capability indication of a UE capability of the UE for maintaining uplink continuity of CFRA uplink channel repetitions for joint channel estimation (block 1010). For example, the UE (e.g., using communication manager 1208 and/or transmission component 1204 depicted in FIG. 12) may transmit a capability indication of a UE capability of the UE for maintaining uplink continuity of CFRA uplink channel repetitions for joint channel estimation, as described above.

As further shown in FIG. 10, in some aspects, process 1000 may include transmitting the CFRA uplink channel repetitions (block 1020). For example, the UE (e.g., using communication manager 1208 and/or transmission component 1204 depicted in FIG. 12) may transmit the CFRA uplink channel repetitions, as described above.

Process 1000 may include additional aspects, such as any single aspect or any combination of aspects described below and/or in connection with one or more other processes described elsewhere herein.

In a first aspect, process 1000 includes receiving a configuration for a preamble that is dedicated for joint channel estimation of CFRA uplink channel repetitions.

In a second aspect, alone or in combination with the first aspect, the configuration includes a continuity indication that indicates that the UE is to maintain uplink continuity for CFRA uplink channel repetitions or PRACH repetitions, and process 1000 includes maintaining uplink continuity based on the continuity indication.

In a third aspect, alone or in combination with one or more of the first and second aspects, process 1000 includes maintaining uplink continuity during the time domain window.

In a fourth aspect, alone or in combination with one or more of the first through third aspects, the time domain window for CFRA uplink repetition matches a time domain window used for other uplink channel communications.

In a fifth aspect, alone or in combination with one or more of the first through fourth aspects, the time domain window for CFRA uplink repetition does not match a time domain window used for other uplink channel communications.

In a sixth aspect, alone or in combination with one or more of the first through fifth aspects, a size of the time domain window for CFRA uplink repetition matches a smaller of a size of a time domain window for other uplink channel communications or a configured time domain window size.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
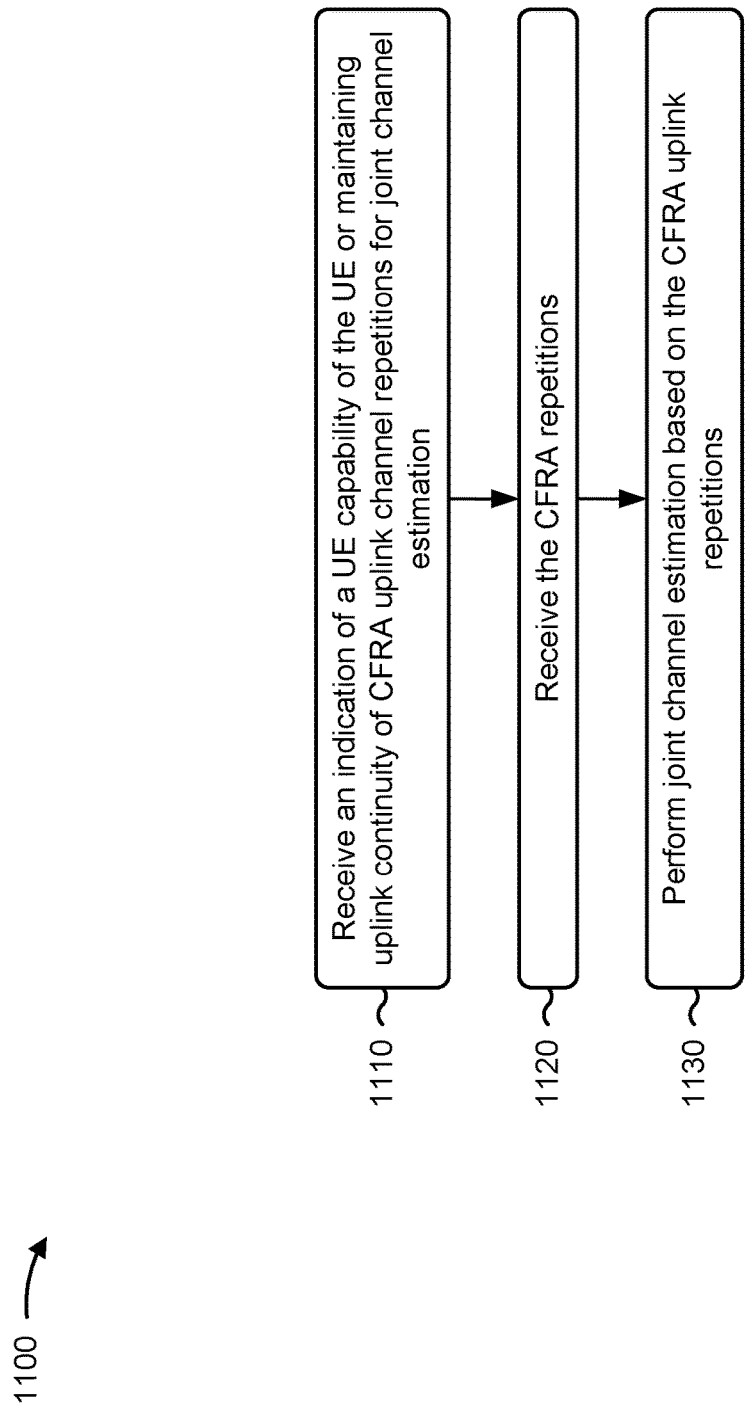
FIG. 11 is a diagram illustrating an example process performed, for example, by a network entity, in accordance with the present disclosure.

FIG. 11 is a diagram illustrating an example process 1100 performed, for example, by a network entity, in accordance with the present disclosure. Example process 1100 is an example where the network entity (e.g., base station 110, network entity 710) performs operations associated with configuring resources for indicating a UE capability of maintaining uplink continuity of random access channel repetitions for joint channel estimations.

As shown in FIG. 11, in some aspects, process 1100 may include receiving an indication of a UE capability of the UE for maintaining uplink continuity of CFRA uplink channel repetitions for joint channel estimation (block 1110). For example, the network entity (e.g., using communication manager 1308 and/or reception component 1302 depicted in FIG. 13) may receive an indication of a UE capability of the UE for maintaining uplink continuity of CFRA uplink channel repetitions for joint channel estimation, as described above.

As further shown in FIG. 11, in some aspects, process 1100 may include receiving the CFRA repetitions (block 1120). For example, the network entity (e.g., using communication manager 1308 and/or reception component 1302 depicted in FIG. 13) may receive the CFRA repetitions, as described above.

As further shown in FIG. 11, in some aspects, process 1100 may include performing joint channel estimation based on the CFRA uplink repetitions (block 1130). For example, the network entity (e.g., using communication manager 1308 and/or channel estimation component 1310 depicted in FIG. 13) may perform joint channel estimation based on the CFRA uplink repetitions, as described above.

Process 1100 may include additional aspects, such as any single aspect or any combination of aspects described below and/or in connection with one or more other processes described elsewhere herein.

In a first aspect, the performing joint channel estimation includes performing joint channel estimation further based on a configuration for the CFRA uplink channel repetitions.

In a second aspect, alone or in combination with the first aspect, the CFRA uplink repetitions include PRACH repetitions.

In a third aspect, alone or in combination with one or more of the first and second aspects, process 1100 includes transmitting a configuration that indicates a time domain window for CFRA uplink repetition, and the performing joint channel estimation includes performing joint channel estimation only during the time domain window.

In a fourth aspect, alone or in combination with one or more of the first through third aspects, the time domain window for CFRA uplink repetition matches a time domain window used for other uplink channel communications.

In a fifth aspect, alone or in combination with one or more of the first through fourth aspects, the time domain window for CFRA uplink repetition does not match a time domain window used for other uplink channel communications.

In a sixth aspect, alone or in combination with one or more of the first through fifth aspects, a size of the time domain window for CFRA uplink repetition matches a smaller of a size of a time domain window for other uplink channel communications or a configured time domain window size.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
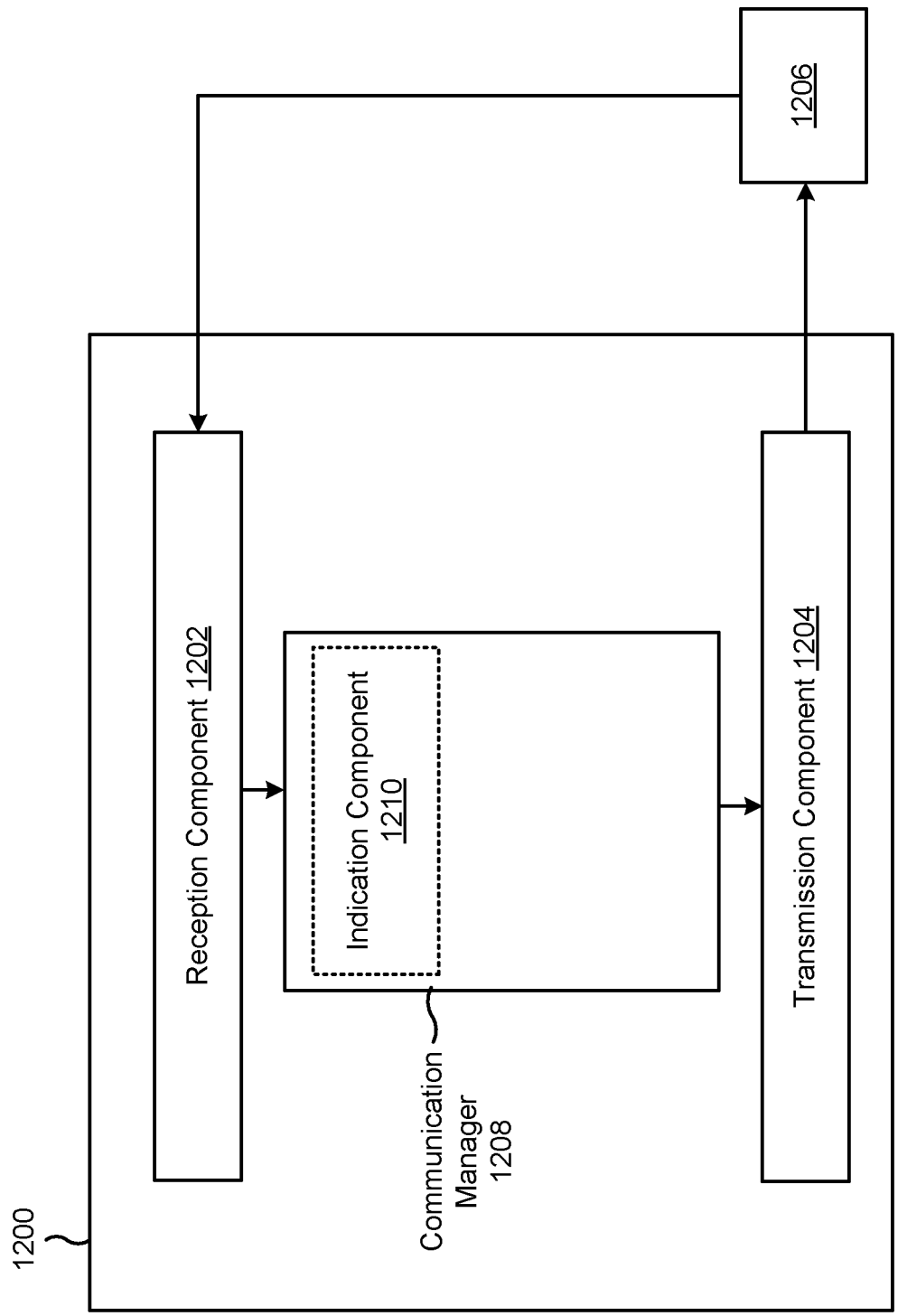
FIGS. 12-13 are diagrams of example apparatuses for wireless communication, in accordance with the present disclosure.

FIG. 12 is a diagram of an example apparatus 1200 for wireless communication, in accordance with the present disclosure. The apparatus 1200 may be a UE (e.g., a UE 120, UE 720), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208. The communication manager 1208 may control and/or otherwise manage one or more operations of the reception component 1202 and/or the transmission component 1204. In some aspects, the communication manager 1208 may include one or more antennas, a modem, a controller/processor, a memory, or a combination thereof, of the UE described in connection with FIG. 2. The communication manager 1208 may be, or be similar to, the communication manager 140 depicted in FIGS. 1 and 2. For example, in some aspects, the communication manager 1208 may be configured to perform one or more of the functions described as being performed by the communication manager 140. In some aspects, the communication manager 1208 may include the reception component 1202 and/or the transmission component 1204. The communication manager 1208 may include an indication component 1210, among other examples.

In some aspects, the apparatus 1200 may be configured to perform one or more operations described herein in connection with FIGS. 1-7. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

In some aspects, the transmission component 1204 may transmit an indication of a UE capability of the UE for maintaining uplink continuity of Msg3 repetitions. The reception component 1202 may receive a configuration specifying resources that indicate Msg3 repetition is to be expected. The transmission component 1204 may transmit a PRACH message in the resources.

The transmission component 1204 may transmit the Msg3 repetitions. The indication component 1210 may use PRACH repetition in combination with the preamble resources to indicate Msg3 repetition. The transmission component 1204 may refrain from frequency-hopping during the configured time domain window.

In some aspects, the transmission component 1204 may transmit a capability indication of a UE capability of the UE for maintaining uplink continuity of CFRA uplink channel repetitions for joint channel estimation. The transmission component 1204 may transmit the CFRA uplink channel repetitions.

The reception component 1202 may receive a configuration for a preamble that is dedicated for joint channel estimation of CFRA uplink channel repetitions. The transmission component 1204 may maintain uplink continuity during the time domain window.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
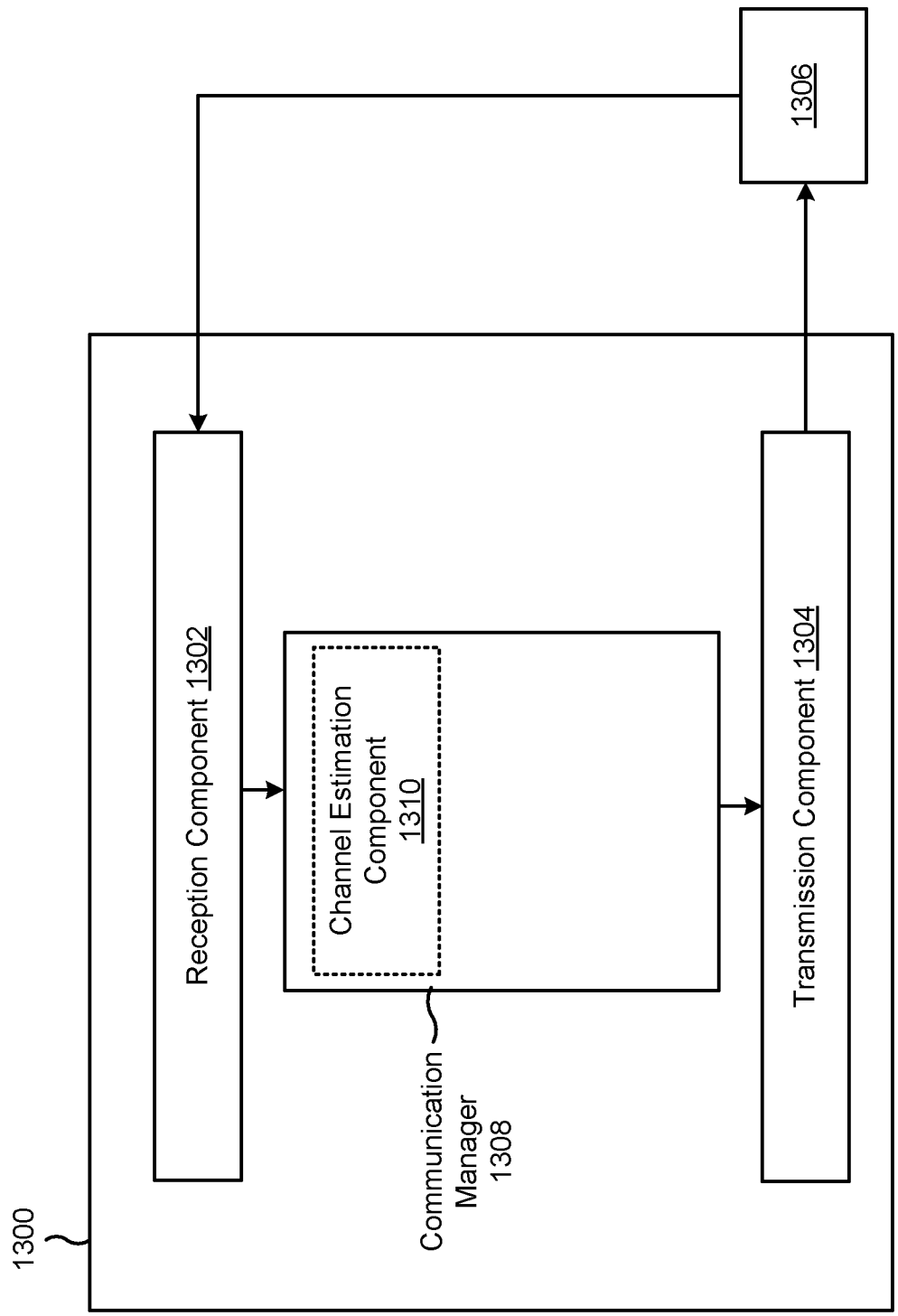

FIG. 13 is a diagram of an example apparatus 1300 for wireless communication, in accordance with the present disclosure. The apparatus 1300 may be a network entity (e.g., base station 110, network entity 710), or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308. The communication manager 1308 may control and/or otherwise manage one or more operations of the reception component 1302 and/or the transmission component 1304. In some aspects, the communication manager 1308 may include one or more antennas, a modem, a controller/processor, a memory, or a combination thereof, of the network entity described in connection with FIG. 2. The communication manager 1308 may be, or be similar to, the communication manager 150 depicted in FIGS. 1 and 2. For example, in some aspects, the communication manager 1308 may be configured to perform one or more of the functions described as being performed by the communication manager 150. In some aspects, the communication manager 1308 may include the reception component 1302 and/or the transmission component 1304. The communication manager 1308 may include a channel estimation component 1310, among other examples.

In some aspects, the apparatus 1300 may be configured to perform one or more operations described herein in connection with FIGS. 1-7. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the network entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity described in connection with FIG. 2. In some aspects, the transmission component 1304 may be co-located with the reception component 1302 in a transceiver.

In some aspects, the reception component 1302 may receive a PRACH message in resources that indicate Msg3 repetition is to be expected. The reception component 1302 may receive Msg3 repetitions. The channel estimation component 1310 may perform joint channel estimation based on the Msg3 repetitions.

In some aspects, the reception component 1302 may receive an indication of a UE capability for maintaining uplink continuity of the Msg3 repetitions for the joint channel estimation. The transmission component 1304 may transmit a configuration specifying the resources based at least in part on the UE capability.

The channel estimation component 1310 may determine that Msg3 repetition is to be expected based on use of the frequency resources in combination with PRACH repetitions. The reception component 1302 may receive PRACH repetitions. The channel estimation component 1310 may perform joint channel estimation based on the PRACH repetitions.

The transmission component 1304 may transmit a configuration that indicates a configured time domain window that is associated with Msg3 repetition, and the channel estimation component 1310 may perform joint channel estimation only within the configured time domain window.

The reception component 1302 may receive an indication of a UE capability of the UE for maintaining uplink continuity of CFRA uplink channel repetitions for joint channel estimation. The reception component 1302 may receive the CFRA repetitions. The channel estimation component 1310 may perform joint channel estimation based on the CFRA uplink repetitions.

The transmission component 1304 may transmit a configuration that indicates a time domain window for CFRA uplink repetition, and the channel estimation component 1310 may perform joint channel estimation only during the time domain window.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: transmitting an indication of a UE capability of the UE for maintaining uplink continuity of Msg3 repetitions; receiving a configuration specifying resources that indicate Msg3 repetition is to be expected; and transmitting a physical random access channel (PRACH) message in the resources.

Aspect 2: The method of Aspect 1, further comprising transmitting the Msg3 repetitions.

Aspect 3: The method of Aspect 1 or 2, wherein the resources include frequency resources that are separate from other frequency resources in an active bandwidth part.

Aspect 4: The method of any of Aspects 1-3, wherein the resources include preamble resources that are dedicated for joint channel estimation of Msg3 repetitions or for joint channel estimation of PRACH repetitions.

Aspect 5: The method of Aspect 4, further comprising using PRACH repetition in combination with the preamble resources to indicate Msg3 repetition.

Aspect 6: The method of any of Aspects 1-5, wherein the configuration includes an indication that the UE is to maintain uplink continuity for Msg3 repetitions, PRACH repetitions, or neither Msg3 repetitions nor PRACH repetitions, and wherein the method includes maintaining uplink continuity based on the indication.

Aspect 7: The method of any of Aspects 1-6, wherein the configuration indicates a configured time domain window that is associated with Msg3 repetition, and wherein the method further includes maintaining uplink continuity during the configured time domain window.

Aspect 8: The method of Aspect 7, further comprising refraining from frequency-hopping during the configured time domain window.

Aspect 9: A method of wireless communication performed by a network entity, comprising: receiving a physical random access channel (PRACH) message in resources that indicate Msg3 repetition is to be expected; receiving Msg3 repetitions; and performing joint channel estimation based on the Msg3 repetitions.

Aspect 10: The method of Aspect 9, further comprising: receiving an indication of a user equipment (UE) capability for maintaining uplink continuity of the Msg3 repetitions for the joint channel estimation; and transmitting a configuration specifying the resources based at least in part on the UE capability.

Aspect 11: The method of Aspect or 109, wherein the resources include frequency resources that are separate from other frequency resources in an active bandwidth part.

Aspect 12: The method of Aspect 11, further comprising determining that Msg3 repetition is to be expected based on use of the frequency resources in combination with PRACH repetitions.

Aspect 13: The method of any of Aspects 9-12, wherein the resources include preamble resources that are dedicated for joint channel estimation of Msg3 repetitions.

Aspect 14: The method of any of Aspects 9-13, further comprising: receiving PRACH repetitions; and performing joint channel estimation based on the PRACH repetitions.

Aspect 15: The method of any of Aspects 9-14, further comprising transmitting a configuration that indicates a configured time domain window that is associated with Msg3 repetition, and wherein the performing joint channel estimation includes performing joint channel estimation only within the configured time domain window.

Aspect 16: A method of wireless communication performed by a user equipment (UE), comprising: transmitting a capability indication of a UE capability of the UE for maintaining uplink continuity of contention-free random access (CFRA) uplink channel repetitions for joint channel estimation; and transmitting the CFRA uplink channel repetitions.

Aspect 17: The method of Aspect 16, further comprising receiving a configuration for a preamble that is dedicated for joint channel estimation of CFRA uplink channel repetitions.

Aspect 18: The method of Aspect 17, wherein the configuration includes a continuity indication that indicates that the UE is to maintain uplink continuity for CFRA uplink channel repetitions or physical random access channel (PRACH) repetitions, and wherein the method includes maintaining uplink continuity based on the continuity indication.

Aspect 19: The method of any of Aspect 16-18, further comprising receiving a configuration that indicates a time domain window for CFRA uplink repetition, and wherein the method further includes maintaining uplink continuity during the time domain window.

Aspect 20: The method of any of Aspect 16-19, wherein the time domain window for CFRA uplink repetition matches a time domain window used for other uplink channel communications.

Aspect 21: The method of any of Aspect 16-19, wherein the time domain window for CFRA uplink repetition does not match a time domain window used for other uplink channel communications.

Aspect 22: The method of Aspect 19, wherein a size of the time domain window for CFRA uplink repetition matches a smaller of a size of a time domain window for other uplink channel communications or a configured time domain window size.

Aspect 23: A method of wireless communication performed by a network entity, comprising: receiving an indication of a user equipment (UE) capability of the UE for maintaining uplink continuity of contention-free random access (CFRA) uplink channel repetitions for joint channel estimation; receiving the CFRA repetitions; and performing joint channel estimation based on the CFRA uplink repetitions.

Aspect 24: The method of Aspect 23, wherein the performing joint channel estimation includes performing joint channel estimation further based on a configuration for the CFRA uplink channel repetitions.

Aspect 25: The method of Aspect 23 or 24, wherein the CFRA uplink repetitions include physical random access channel (PRACH) repetitions.

Aspect 26: The method of any of Aspect 23-25, further comprising transmitting a configuration that indicates a time domain window for CFRA uplink repetition, and wherein the performing joint channel estimation includes performing joint channel estimation only during the time domain window.

Aspect 27: The method of any of Aspect 23-26, wherein the time domain window for CFRA uplink repetition matches a time domain window used for other uplink channel communications.

Aspect 28: The method of any of Aspect 23-26, wherein the time domain window for CFRA uplink repetition does not match a time domain window used for other uplink channel communications.

Aspect 29: The method of any of Aspect 23-28, wherein a size of the time domain window for CFRA uplink repetition matches a smaller of a size of a time domain window for other uplink channel communications or a configured time domain window size.

Aspect 30: An apparatus for wireless communication at a device, comprising a processor; memory coupled with the processor; and instructions stored in the memory and executable by the processor to cause the apparatus to perform the method of one or more of Aspects 1-29.

Aspect 31: A device for wireless communication, comprising memory, and one or more processors coupled to the memory, the memory comprising instructions executable by the one or more processors to cause the device to perform the method of one or more of Aspects 1-29.

Aspect 32: A device for wireless communication, comprising a memory and one or more processors coupled to the memory, the one or more processors configured to perform the method of one or more of Aspects 1-29.

Aspect 33: An apparatus for wireless communication, comprising at least one means for performing the method of one or more of Aspects 1-29.

Aspect 34: A non-transitory computer-readable medium storing code for wireless communication, the code comprising instructions executable by a processor to perform the method of one or more of Aspects 1-29.

Aspect 35: A non-transitory computer-readable medium storing a set of instructions for wireless communication, the set of instructions comprising one or more instructions that, when executed by one or more processors of a device, cause the device to perform the method of one or more of Aspects 1-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more memories including instructions executable by the one or more processors to cause the UE to:
      transmit an indication of a UE capability of the UE for maintaining uplink continuity of Msg3 repetitions;
      receive, after transmitting the indication, a configuration specifying preamble resources that indicate Msg3 repetition is to be expected; and
      transmit, after receiving the configuration, a physical random access channel (PRACH) message in the preamble resources.

2. The UE of claim 1, wherein the one or more memories further include instructions executable by the one or more processors to cause the UE to transmit the Msg3 repetitions.

3. The UE of claim 1, wherein the preamble resources include frequency resources that are separate from other frequency resources in an active bandwidth part.

4. The UE of claim 1, wherein the preamble resources include preamble resources that are dedicated for joint channel estimation of Msg3 repetitions or for joint channel estimation of PRACH repetitions.

5. The UE of claim 4, wherein the one or more memories further include instructions executable by the one or more processors to cause the UE to use PRACH repetition in combination with the preamble resources to indicate Msg3 repetition.

6. The UE of claim 1, wherein the configuration includes an indication that the UE is to maintain uplink continuity for Msg3 repetitions, PRACH repetitions, or neither Msg3 repetitions nor PRACH repetitions, and wherein the one or more memories further include instructions executable by the one or more processors to cause the UE to maintain uplink continuity based on the indication.

7. The UE of claim 1, wherein the configuration indicates a configured time domain window that is associated with Msg3 repetition, and wherein the one or more memories further include instructions executable by the one or more processors to cause the UE to maintain uplink continuity during the configured time domain window.

8. The UE of claim 7, wherein the one or more memories further include instructions executable by the one or more processors to cause the UE to refrain from frequency-hopping during the configured time domain window.

9. A method of wireless communication performed by a user equipment (UE), comprising:
   transmitting, before transmitting a preamble of a contention-free random access (CFRA) procedure, a capability indication of a UE capability of the UE for maintaining uplink continuity of CFRA uplink channel repetitions for joint channel estimation; and
   transmitting, after transmitting the capability indication, the CFRA uplink channel repetitions.

10. The method of claim 9, further comprising receiving a configuration for a preamble that is dedicated for joint channel estimation of CFRA uplink channel repetitions.

11. The method of claim 10, wherein the configuration includes a continuity indication that indicates that the UE is to maintain uplink continuity for CFRA uplink channel repetitions or physical random access channel (PRACH) repetitions, and wherein the method further comprises maintaining uplink continuity based on the continuity indication.

12. The method of claim 9, further comprising:
receiving a configuration that indicates a time domain window for CFRA uplink repetition; and
maintaining uplink continuity during the time domain window.

13. The method of claim 12, wherein the time domain window for CFRA uplink repetition matches a time domain window used for other uplink channel communications.

14. The method of claim 12, wherein the time domain window for CFRA uplink repetition does not match a time domain window used for other uplink channel communications.

15. A user equipment (UE) for wireless communication, comprising:
one or more memories; and
one or more processors coupled to the one or more memories, the one or more memories including instructions executable by the one or more processors to cause the UE to:
transmit, before transmitting a preamble of a contention-free random access (CFRA) procedure, a capability indication of a UE capability of the UE for maintaining uplink continuity of CFRA uplink channel repetitions for joint channel estimation; and
transmit, after transmitting the capability indication, the CFRA uplink channel repetitions.

16. The UE of claim 15, wherein the one or more memories further include instructions executable by the one or more processors to cause the UE to receive a configuration for a preamble that is dedicated for joint channel estimation of CFRA uplink channel repetitions.

17. The UE of claim 16, wherein the configuration includes a continuity indication that indicates that the UE is to maintain uplink continuity for CFRA uplink channel repetitions or physical random access channel (PRACH) repetitions, and wherein the one or more memories further include instructions executable by the one or more processors to cause the UE to maintain uplink continuity based on the continuity indication.

18. The UE of claim 15, wherein the one or more memories further include instructions executable by the one or more processors to cause the UE to receive a configuration that indicates a time domain window for CFRA uplink repetition, and wherein the one or more memories further include instructions executable by the one or more processors to cause the UE to maintain uplink continuity during the time domain window.

19. The UE of claim 18, wherein a size of the time domain window for CFRA uplink repetition matches a smaller of a size of a time domain window for other uplink channel communications or a configured time domain window size.

20. The UE of claim 18, wherein the time domain window for CFRA uplink repetition matches a time domain window used for other uplink channel communications.

21. The UE of claim 18, wherein the time domain window for CFRA uplink repetition does not match a time domain window used for other uplink channel communications.

22. A method of wireless communication performed by a user equipment (UE), comprising:
transmitting an indication of a UE capability of the UE for maintaining uplink continuity of Msg3 repetitions;
receiving, after transmitting the indication, a configuration specifying preamble resources that indicate Msg3 repetition is to be expected; and
transmitting, after receiving the configuration, a physical random access channel (PRACH) message in the preamble resources.

23. The method of claim 22, further comprising transmitting the Msg3 repetitions.

24. The method of claim 22, wherein the preamble resources include frequency resources that are separate from other frequency resources in an active bandwidth part.

25. The method of claim 22, wherein the preamble resources include preamble resources that are dedicated for joint channel estimation of Msg3 repetitions or for joint channel estimation of PRACH repetitions.

26. The method of claim 25, further comprising using PRACH repetition in combination with the preamble resources to indicate Msg3 repetition.

27. The method of claim 22, wherein the configuration includes an indication that the UE is to maintain uplink continuity for Msg3 repetitions, PRACH repetitions, or neither Msg3 repetitions nor PRACH repetitions, and wherein the method further comprises maintaining uplink continuity based on the indication.

28. The method of claim 22, wherein the configuration indicates a configured time domain window that is associated with Msg3 repetition, and wherein the method further comprises maintaining uplink continuity during the configured time domain window.

29. The method of claim 28, further comprising refraining from frequency-hopping during the configured time domain window.

* * * * *